United States Patent
Aschoff et al.

(10) Patent No.: US 9,113,279 B2
(45) Date of Patent: Aug. 18, 2015

(54) METHOD FOR ADJUSTING A HEARING APPARATUS VIA A FORMAL LANGUAGE

(71) Applicant: SIEMENS MEDICAL INSTRUMENTS PTE. LTD., Singapore (SG)

(72) Inventors: Stefan Aschoff, Bubenereuth (DE); Thorsten Stocksmeier, Erlangen (DE)

(73) Assignee: Sivantos Group, Erlangen (DE)

( * ) Notice: Subject to any disclaimer, the term of this patent is extended or adjusted under 35 U.S.C. 154(b) by 63 days.

(21) Appl. No.: 13/692,037

(22) Filed: Dec. 3, 2012

(65) Prior Publication Data
US 2013/0251179 A1  Sep. 26, 2013

Related U.S. Application Data

(60) Provisional application No. 61/565,599, filed on Dec. 1, 2011.

(30) Foreign Application Priority Data

Dec. 1, 2011  (DE) .......................... 10 2011 087 569

(51) Int. Cl.
*G06F 9/44*  (2006.01)
*G06F 9/45*  (2006.01)
(Continued)

(52) U.S. Cl.
CPC  *H04R 25/70* (2013.01); *G06F 8/31* (2013.01); *G06F 8/35* (2013.01); *G06F 8/41* (2013.01); *G06F 8/61* (2013.01); *H04R 25/505* (2013.01); *H04R 2225/55* (2013.01)

(58) Field of Classification Search
CPC ... G06F 11/3664; G06F 11/3688; G06F 8/52; G06F 8/51; G06F 9/541; G06F 8/31; G06F 8/41; H04R 25/70; H04R 25/505; H04R 2225/41
See application file for complete search history.

(56) References Cited

U.S. PATENT DOCUMENTS 6,799,718 B2 *  10/2004  Chan et al. ................... 717/137
7,605,812 B2 *  10/2009  McBagonluri et al. ....... 345/420
2003/0112987 A1 *  6/2003  Nordqvist et al. ............ 381/312

(Continued)

OTHER PUBLICATIONS

Ken Friis Larsen, "Types for DSP Assembler Programs", Technical University of Denmark, Nov. 2003, pp. 1-132; <http://orbit.dtu.dk/fedora/objects/orbit:79280/datastreams/file_3080613/content>.*

(Continued)

*Primary Examiner* — Thuy Dao
*Assistant Examiner* — Ben C Wang
(74) *Attorney, Agent, or Firm* — Laurence A. Greenberg; Werner H. Stemer; Ralph E. Locher

(57) ABSTRACT

A method adjusts a hearing apparatus and thus provides a simplified hearing aid. In the method, a model is created which describes individual hardware components of the hearing apparatus. In addition a formal language is created on the basis of the model. The formal language is used to develop a program. The program is translated into machine executable code. The code is then transferred to the hearing apparatus, the execution of which causes the hearing apparatus to be adjusted automatically in accordance with the program. As an alternative to the transfer to the hearing system, the code is executed by a hearing aid adjustment program and a target parameter set for the hearing apparatus which the adjustment program then transfers into the hearing apparatus is thus calculated.

11 Claims, 4 Drawing Sheets

(51) Int. Cl.
*H04R 25/00* (2006.01)
*G06F 9/445* (2006.01)

(56) References Cited

U.S. PATENT DOCUMENTS

| | | | |
|---|---|---|---|
| 2004/0208330 A1* | 10/2004 | Chalupper et al. | 381/314 |
| 2005/0036637 A1* | 2/2005 | Janssen | 381/315 |
| 2006/0083395 A1* | 4/2006 | Allen et al. | 381/312 |
| 2006/0245610 A1* | 11/2006 | Chalupper | 381/321 |
| 2007/0156063 A1* | 7/2007 | Zoth et al. | 600/559 |
| 2008/0298600 A1* | 12/2008 | Poe et al. | 381/60 |
| 2009/0010464 A1* | 1/2009 | Kornagel | 381/312 |
| 2010/0202636 A1* | 8/2010 | Frohlich et al. | 381/314 |
| 2011/0051943 A1* | 3/2011 | Giese et al. | 381/60 |
| 2011/0051964 A1* | 3/2011 | Balke et al. | 381/321 |
| 2011/0150253 A1* | 6/2011 | Corona-Strauss et al. | 381/314 |
| 2011/0188682 A1 | 8/2011 | Menzl et al. | |
| 2011/0194706 A1* | 8/2011 | Shim | 381/60 |
| 2011/0200216 A1* | 8/2011 | Lee et al. | 381/314 |
| 2012/0027227 A1* | 2/2012 | Kok et al. | 381/107 |
| 2012/0140937 A1* | 6/2012 | Poe et al. | 381/60 |
| 2012/0183166 A1* | 7/2012 | Schneider et al. | 381/314 |
| 2012/0201407 A1* | 8/2012 | Spieler et al. | 381/314 |
| 2013/0114836 A1* | 5/2013 | Fichtl et al. | 381/314 |
| 2014/0307903 A1* | 10/2014 | Fichtl | 381/315 |

OTHER PUBLICATIONS

Nielsen et al., "Perception-based personalization of hearing aids using Gaussian processes and active learning", IEEE, vol. 23 Issue 1, Jan. 2015, pp. 162-173; <http://ieeexplore.ieee.org/stamp/stamp.jsp?tp=&arnumber=6975061>.*

Dahl et al., "Co-Designing Interactive Tabletop Solutions for Active Patient Involvement in Audiological Consultations", ACM, NordiCHI'14, Oct. 26, 2014, pp. 207-216; <http://dl.acm.org/results.cfm?h=1&source_query=&&cfid=653252866&cftoken=75094448>.*

* cited by examiner

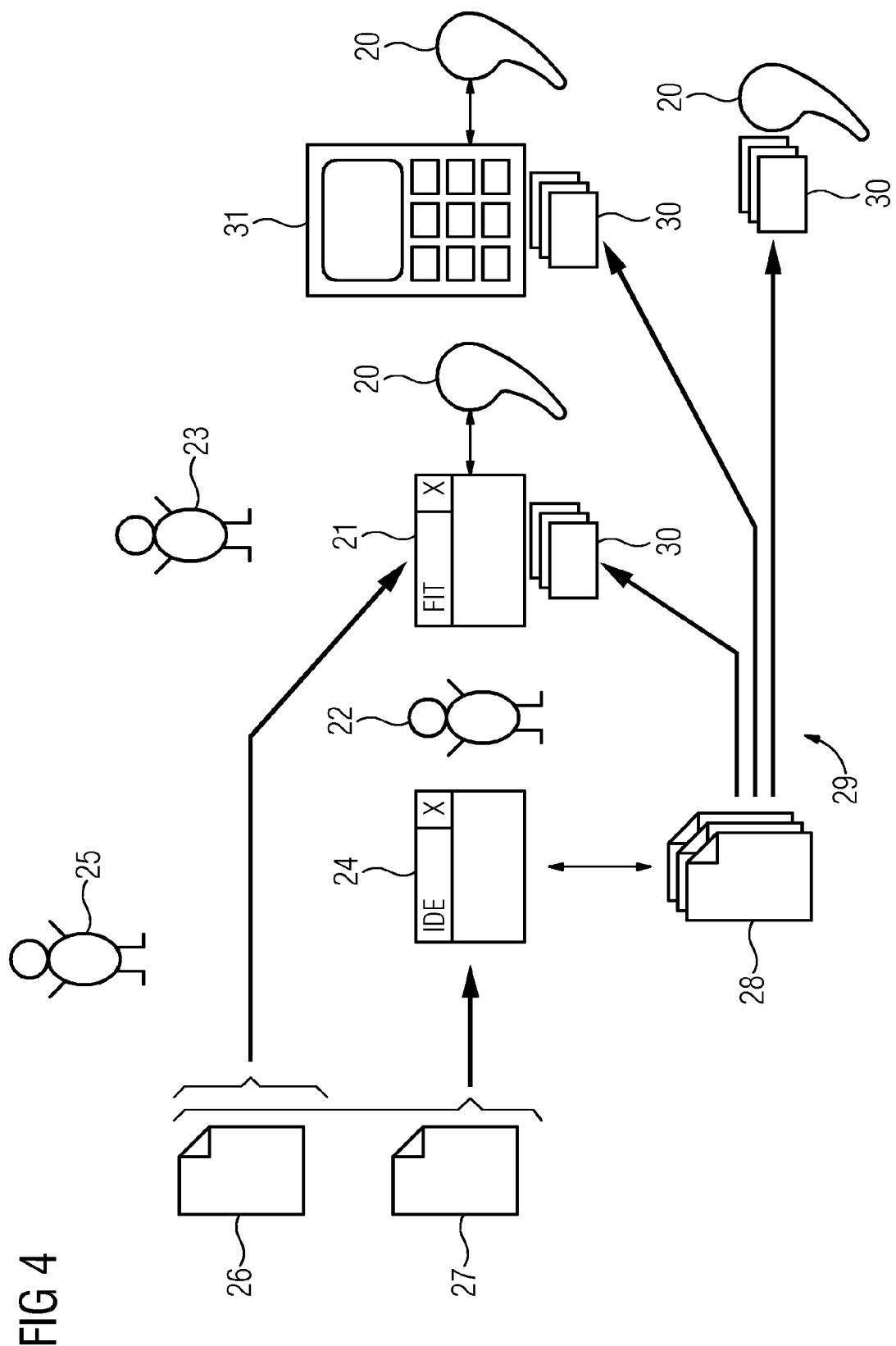

METHOD FOR ADJUSTING A HEARING APPARATUS VIA A FORMAL LANGUAGE

CROSS-REFERENCE TO RELATED APPLICATION

This application claims the benefit, under 35 U.S.C. §119 (e), of provisional application No. 61/565,599 filed Dec. 1, 2011; this application also claims the priority, under 35 U.S.C. §119, of German patent application No. DE 10 2011 087 569.7, filed Dec. 1, 2011; the prior applications are herewith incorporated by reference in its entireties.

BACKGROUND OF THE INVENTION

Field of the Invention

The present invention relates to a method for adjusting a hearing apparatus. A hearing apparatus is understood here to be any device producing an auditory stimulus, which can be worn in or on the ear, in particular a hearing aid, a headset, headphones and the like.

Hearing aids are wearable hearing apparatuses which are used for providing care for the hard of hearing. In order to meet the numerous individual needs, different designs of hearing aids such as behind-the-ear hearing aids (BTE), hearing aid with an external earpiece (RIC: receiver in the canal) and in-the-ear hearing aids (ITE), for example also concha hearing aids or completely-in-canal hearing aids (ITE, CIC), are made available. The hearing aids cited by way of example are worn on the outer ear or in the auditory canal. In addition, bone conduction hearing aids, implantable or vibrotactile hearing aids are however also available on the market. In this situation the stimulation of the damaged hearing takes place either mechanically or electrically.

In principle, hearing aids have as their essential components an input converter, an amplifier and an output converter. The input converter is as a rule a sound receiver, for example a microphone, and/or an electromagnetic receiver, for example an induction coil. The output converter is implemented for the most part as an electroacoustic converter, for example a miniature loudspeaker, or as an electromechanical converter, for example a bone conductor. The amplifier is usually integrated in a signal processing unit. This basic structure is illustrated in FIG. 1 by way of example of a behind-the-ear hearing aid. One or more microphones 2 for receiving the sound from the surroundings are incorporated into a hearing aid housing 1 for wearing behind the ear. A signal processing unit 3, which is likewise integrated in the hearing aid housing 1, processes the microphone signals and amplifies them. The output signal from the signal processing unit 3 is transferred to a loudspeaker or earpiece 4 which outputs an acoustic signal. Where applicable, the sound is transferred by way of a sound tube, which is fixed in the auditory canal by an earmold, to the eardrum of the device wearer. The power supply for the hearing aid and in particular for the signal processing unit 3 is provided by a battery 5 likewise integrated in the hearing aid housing 1.

Given the high level of complexity of current hearing aid platforms, the development of hearing aid adjustment systems is a substantial task for which software engineering methods are employed.

The definition of features, in other words characteristics of a hearing system (synonym for hearing apparatus), is undertaken in large part by experts in the field of audiology/hearing system adjustment. An extensive software engineering process is then also set in motion for the implementation thereof.

The German term for software engineering is "Software-Technik", which is defined as follows according to the German Wikipedia, Quotation:

"Target-oriented provision and systematic use of principles, methods and tools for the engineering development and application of comprehensive software systems, based on the division of labor" (Ref. Balzert, p. 36)]

It is apparent from Wikipedia as well as the standard literature that the typical phases of a software project include at an early stage the definition of requirements (requirements engineering) and then later phases such as software architecture, programming/implementation. The software engineering is typically a housing of teamwork where personnel having different qualifications and roles become active in the individual phases of a software project: the requirements engineer, the architect, the software developer, who may have specialized in a specific area of the software, the software tester.

Furthermore, so-called "formal languages" are known. Refer here to "Enzyklopadie der Wirtschaftsinformatik, Online-Lexikon" at www.enzyklopaedie-der-wirtschaftsinformatik.de/wi-enzyklopaedie/l-exikon/technologien-methoden/Sprache/Formale-Sprache.

Quotation:

A formal language represents an artificial language defined for the most part with the aid of the natural language. The initiative for the development and use of formal languages came from research from the field of programming languages (information technology) and also modeling languages for the representation of business-related information. The consequences were on the one hand higher-level (more abstract) programming languages and on the other hand semantic models. With their aid it should be possible to develop complex systems such as application programs or corporate networks more effectively and more efficiently.

SUMMARY OF THE INVENTION

It is accordingly an object of the invention to provide method for adjusting a hearing apparatus via a formal language which overcome the above-mentioned disadvantages of the prior art methods of this general type, which enables a hearing apparatus or a hearing system to be more simply adjusted.

According to the invention, the object is achieved by a method for adjusting a hearing apparatus through creation of a formal model which describes parameters of individual hardware components of the hearing apparatus and supplements these parameters where applicable with aspects of a description specific to the field of application. A formal language is created on the basis of the model. A program is created with the aid of the formal language and the program is translated into machine executable code. The machine executable code is transferred to the hearing apparatus, the execution of which causes the hearing apparatus to be adjusted automatically in accordance with the program.

"Hearing system" or "hearing apparatus" refers to a system formed of hardware and software, wherein the hardware in question contains the one or two hearing aids of a person having a reduced hearing capability and the software in question is software which is implemented entirely in the hearing aid ("firmware") or partially in the hearing aid and partially in a device which is connected to the hearing aid(s) (for example smart phone, remote control).

In an advantageous manner, a specific formal language by which the hearing apparatus can then be adjusted is therefore developed on the basis of a concrete hardware structure of a hearing apparatus. The behavior of hearing systems can thus be written down by application experts in hearing aid acoustics (for example hearing aid acoustician or audiologist) by using a formal language ("domain-specific language") in the form of human readable programs and translated automatically into machine executable programs using the model. This development process can be undertaken autonomously by the application expert, in other words without the further assistance of experts in software development. The automatic translation is carried out for example by producing a program which is executed by the adjustment or fitting software. Alternatively, the application expert is offered the facility to create automatic programs for other target systems: accessories such as smart phones, remote controls or else directly for the hearing aid.

The method makes it possible to divide the individual method steps among different experts who are developing the hearing system.

The following are made available on a one-off basis by the manufacturer of the hearing systems for the hearing system:
  the formal model,
  the formal language,
  an automatic translation mechanism for translating programs which are written in the formal language, and
  an automated transfer of the machine executable code to the hearing apparatus.

Thereafter, a plurality of application experts in audiology (preferably also experts from OEM purchasers from the hearing system manufacturer or other partners) can carry out the following steps: creation of a program by using the formal language in each housing (for each program), a translation process by activating the automatic translation mechanism. This translation process produces machine executable code. In each housing, the transfer of the machine executable code by activating the automated transfer. This is the means by which the machine executable code reaches the hearing system.

The method steps performed by the manufacturer of the hearing system on a one-off basis (per hardware device) therefore define the hearing system as a platform on which the application experts implement product-specific behavior for the hearing system.

For the manufacturer, this thereby yields the advantages of a systematic separation of platform and product development and also a reduction in development effort, development time and susceptibility to faults during the product development of hearing systems. In addition, the manufacturer offers application experts the capability to create prototypes of audiological performance features which can be quickly realized and to be able where applicable to repeat and refine said process. (Note: this is referred to as "rapid prototyping"). This reduces the resource requirements on the application experts involved in the entire development process, which means that the resource requirements pertaining to the manufacturer of the hearing system or else to the OEM purchaser/partner are reduced accordingly.

In addition, the capability exists to realize audiological performance features automatically on different target systems (examples: sequence in an adjustment application, smart phone, manufacturer-specific remote control and in the hearing aid).

The acoustician therefore advantageously has the capability on the basis of his/her own specialist audiological knowledge to define and perform the fine adjustment of hearing systems and to test it on and with the patient. In addition, the method according to the invention offers the capability to undertake very individual hearing system adjustments with patients.

In one special embodiment of the method according to the invention, at least one of the hardware components of the hearing apparatus is a filter bank or an amplifier, the parameters of which are set by means of the program.

According to a further embodiment, a hearing loss can be measured by a user of the hearing apparatus and the program can act or branch depending on the measured hearing loss. In particular, the formal language is designed such that the measured hearing loss of a patient or also other characteristics of the patient (for example age, sex) can be interrogated and then enable the application expert to make the further execution of his programs dependent thereon. This can for example be accomplished in that only individual program parts run selectively dependent on the hearing loss. This procedure allows the initial adjustment of a hearing system to be defined in such a manner that it can be performed on the patient.

When the program is being created, a hearing program can be produced for a predetermined ambient situation. It is thus possible to deal very flexibly with very individual ambient situations. Likewise, the program created in the formal language can also be used on a lower level in order to adjust to the predetermined ambient situation without having to provide an entire hearing program. In this situation, one ambient situation can be defined in particular by one or more independent parameters.

The program created in the formal language can be designed such that it is activated automatically when the specific ambient situation exists or in a predetermined state transition of the hearing apparatus. The user therefore has the capability to individually control the activation of programs himself.

According to a further development, the translation of the program consists in the program being firstly translated into a software program which can be executed by a hearing aid adjustment program, and subsequently the software program is transformed by the hearing aid adjustment program into machine executable code. Alternatively, the hearing aid adjustment program can utilize the execution of the program in order to calculate a target parameter set for the hearing aid in order to then program this into the hearing aid.

In this manner, an already existing hearing aid adjustment program can continue to be used, which means that the compiler for the program in the formal language can function on a higher level and does not need to perform the conversion into machine executable code.

By preference, the program is created using an editor which marks a programming error during the input process. In this manner, the program in the formal language can also be created more quickly for less experienced application experts.

In a special embodiment, the translation of the program takes place in a first step through transformation of the program into a syntax tree and in a second step through translation of the syntax tree into a program which can be executed for the hearing apparatus. In this manner, it is also possible to translate a very complex program into machine executable code.

Other features which are considered as characteristic for the invention are set forth in the appended claims.

Although the invention is illustrated and described herein as embodied in a method for adjusting a hearing apparatus via a formal language, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is an illustration relating to the creation of machine executable code for hearing apparatuses.

DETAILED DESCRIPTION OF THE INVENTION

Figure 1:
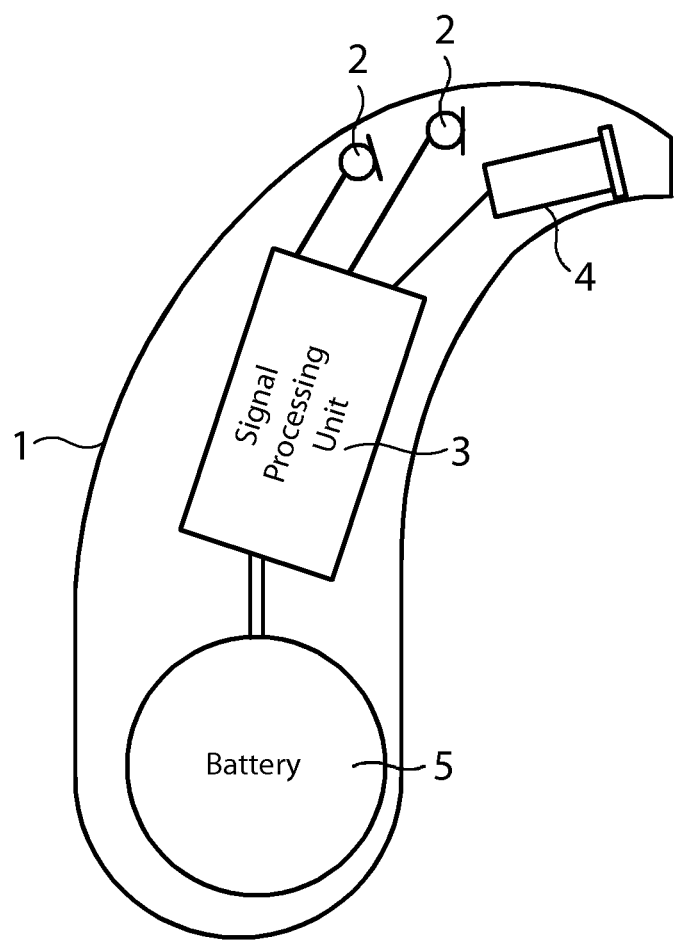
FIG. 1 is an illustration of a basic design of a hearing aid in accordance with the prior art.

The exemplary embodiments described in detail in the following constitute preferred embodiments of the present invention.

The method according to the invention is used for the patient-specific adjustment of hearing systems. A formal language and also software for automatic implementation are employed in this situation.

The invention provides that the behavior of a hearing system can be defined by a person skilled in the art of audiology and can be implemented by a software system without the need to set in motion a complex software development process for the purpose of implementation.

It is important for the invention that the behavior of a hearing system can be determined by a person skilled in the art of the field of application without having to call in specialists in the development of the hearing system (system developer, software developer etc.). In this situation the person skilled in the art can be a person skilled in the art employed by a hearing aid manufacturer (manufacturer or OEM purchaser), an acoustician (who adjusts hearing aids to the needs and preferences of a person having a reduced hearing capability), or also an experienced person having a reduced hearing capability.

The invention describes a method for performing an adjustment of a hearing system for a set of application situations which can be defined in advance by the manufacturer of the hearing system. Initially an execution of a first fit (initial adjustment based on the measured hearing loss) is performed and then activation of a hearing program which is optimized for a particular ambient situation (for example telephone, music, TV) is performed.

A further configuration level of the invention enables the adjustment for application situations (or special instances of application situations) which can be defined at any time and include:

optimizations of hearing programs for ambient situations which are not predetermined by the manufacturer;

individual ambient situations clearly recognizable for the person having a reduced hearing capability, for example the hearing aid is essentially good, except that the clattering of crockery is too shrill; and special settings which occur as a result of the occurrence of certain states, for example whenever the classifier of the hearing system has detected the ambient state "quiet" between 8:00 a.m. and 9:00 a.m., then . . . (for example the person having a reduced hearing capability is reading his morning newspaper and does not wish his leafing through the newspaper to sound like a storm).

Specifically this configuration level of the invention allows the application to appear of interest to persons skilled in the art who do not work for a manufacturer of hearing systems, in other words established acousticians or experienced persons having a reduced hearing capability.

The method according to the invention or a corresponding system therefore enables a person skilled in the art/application expert (a person experienced in the specialist area of audiology) to create requirements on the behavior of a hearing system and to automatically translate these requirements into a program which can be executed by the hearing system (target system).

In order that the requirements can be automatically translated into a program for the target system, they must be present in formalized form (in other words formal, not informal).

The invention therefore provides for the definition of a formal language in which the person skilled in the art is able to write down his requirements as an action guideline, consisting of a finite number of steps (algorithm), for the hearing system for a set of application situations.

A key aspect of the invention is the fact that on the input side of the method/system the application expert can define the behavior of a hearing system in human readable form or more precisely: application expert readable form—as formal algorithms and can translate these automatically into machine executable programs onto the hearing system.

In order that this formal language can be employed for the person skilled in the art, it contains a vocabulary of identifiers, i.e. words, which are taken from the field of application of hearing system adjustment and their meaning therefore becomes accessible for a person skilled in the art (examples: amplification, compression, frequency, curve). Furthermore, no words are contained among these identifiers which have no correspondence in the field of application. These include in particular terms having a primarily technical meaning (examples: hardware register addresses, commands for register operations, hardware coefficients).

In addition, a syntax definition (i.e. rules for sequencing the elements of the formal language: symbols (alphabetic characters), identifiers, keywords) which is optimized in respect of good legibility and comprehensibility for the application expert is used for the formal language. It is only the subsequent translation process according to the invention which produces a machine executable program conforming to a machine compatible syntax.

The specialist term "Domain Specific Language" (DSL) is also used in the following for the formal language. The invention therefore provides for the use of a DSL which is specialized in the domain of hearing system adjustment.

In addition, the invention provides an automatic translation process which enables the requirements created by the person skilled in the art to be translated into a software program which can be executed by the hearing system.

Alternatively, the requirements can also be translated into a software program which can be executed by the hearing aid adjustment program. After execution in the hearing aid adjustment program the hearing system is modified accordingly.

In a particularly preferred embodiment, the hearing system is configured by the manufacturer that machine executable code which has been created according to the invention by the person skilled in the art (entered, created using the automatic translation process and transferred to the hearing system using the automated transfer) is activated in the event of state transitions in the hearing system. These state transitions can be those that are induced directly as a result of use of the hearing system by the person having a reduced hearing capability: actuations of control elements by the person having a reduced hearing capability, certain sound input levels being exceeded or undershot, the occurrence of a certain classification result from the continuous ambient analysis ("classifier") and others.

However, it is also possible to take into consideration state transitions originating from the interaction between the person having a reduced hearing capability and an acoustician or manufacturer, for example the expiry of a trial period for a certain feature or the customer acquiring a license key for a feature.

This means that the behavior of the hearing system can be set very specifically to the ambient situation and to personal preferences of an individual person having a reduced hearing capability.

Figure 2:
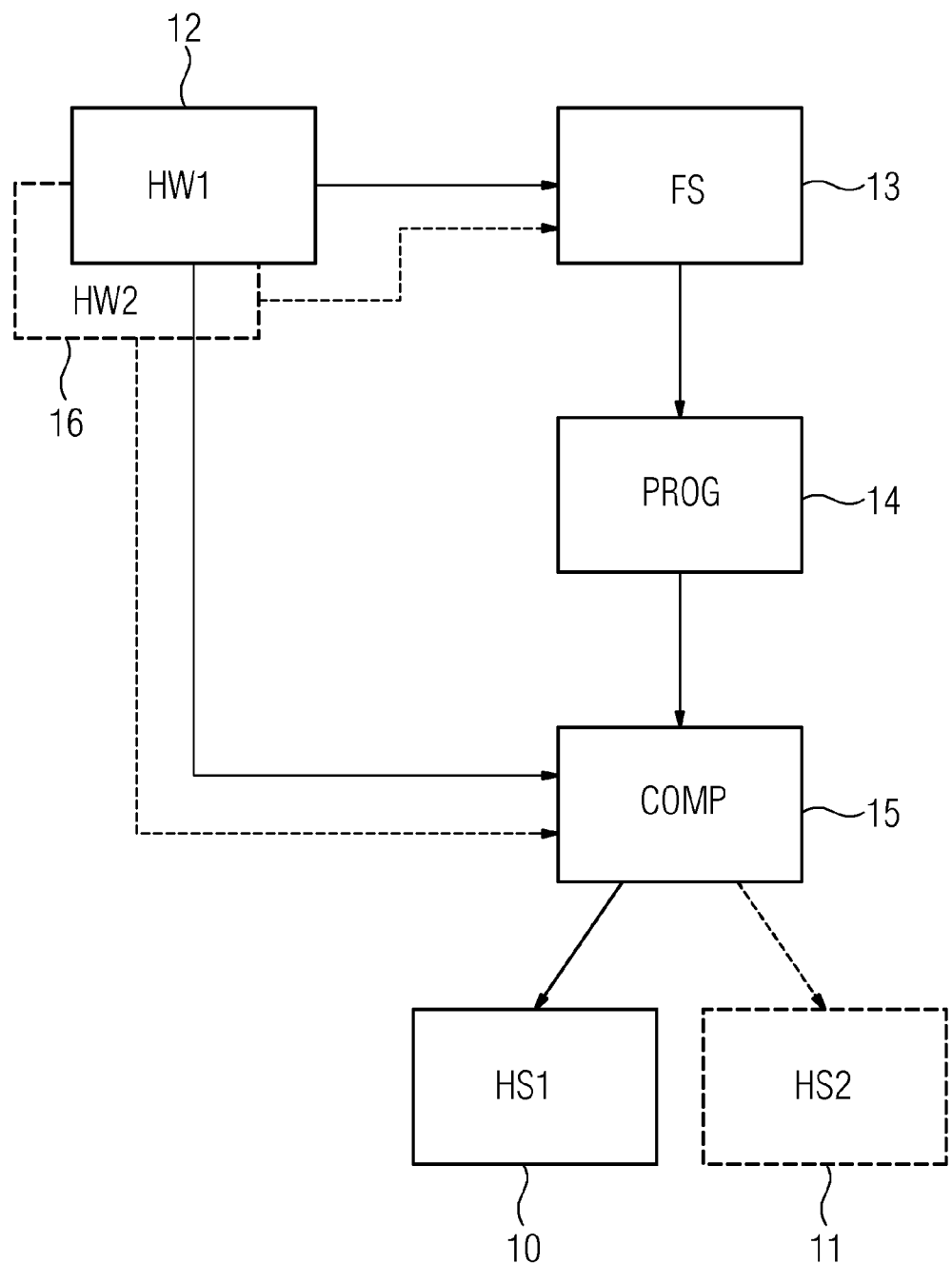
FIG. 2 is a schematic block diagram of an adjustment method according to the invention.

FIG. 2 schematically shows the adjustment of one or more hearing systems 10, 11 (HS1, HS2). Firstly, however, the adjustment of the single hearing system 10 is described.

The hearing system 10 has a specific hardware structure. In particular, the hearing system 10 (for example a hearing aid) has for example an amplifier and a filter bank which are each to be regarded as hardware components, even if they are implemented together for example as an integrated circuit. A feedback suppression facility, a wind noise suppression facility, a directional microphone and the like, for example, are also understood here to be hardware components. Even if such types of components can also be realized as software, they are implemented on hardware and therefore referred to here as hardware components. The hardware components can be set individually. Each hardware component can have one or more setting parameters. It is thus possible for example not only to set an amplifier to be louder and quieter, but it is also possible to change its compression characteristic. All these hardware components with their setting options can be described in a hardware model 12 (HW1). A hearing aid with its specific hardware components therefore has a specific hardware model 12.

The setting parameters described in the hardware model are provided with domain-specific designations. In addition to these identifiers which are understandable to the application expert, special transformation rules are stored in the model where necessary.

The latter enable logical data values (i.e. in a notation understandable to the application expert, for example "−3 dB") to be converted into technical data values (which can be applied onto the hardware, for example bit patterns). This conversion is likewise possible in the opposite direction.

As an alternative to a transformation rule, the transformation process from logical into physical parameter values can be made possible by translation tables for relevant parameters being contained in the model. These translation tables juxtapose every possible logical (domain-specific) notation of a value with the technical (hardware-specific) specification of the value.

This means that a hardware abstraction is contained in the model: The values of the parameters are defined and can be translated both in domain-specific and also in hardware-specific form.

A formal language is developed for the model. The syntax of this language is on the one hand optimized for good understandability by the application expert. On the other hand this language definition also contains the domain-specific identifiers which are stored in the model.

The specific hardware model is therefore the basis for the formal language 13 (FS). The syntax of the language is configured such that it is understandable by the application expert. This is achieved by the syntax using the identifiers which are contained as domain-specific identifiers in the hardware model where they describe the aforementioned setting parameters. This means that the language is tailored to hardware model 12. A user now uses the formal language 13 in order to thereby create a program 14, namely an adjustment program for the hearing system 10. The adjustment program 14 is translated into machine executable code with the aid of a compiler 15 (COMP). To this end, information from or about the hardware model 12 is also required. The machine executable code is finally transferred to the hearing system 10, as a result of which the latter is adjusted in the desired manner.

The formal language 13 can be abstracted such that it can also be used for adjustment of the second hearing system 11 (HS2). The second hearing system 11 is of a different type to the first hearing system 10. It has a likewise specific hardware structure which can be described by means of a second hardware model 16 (HW2). The formal language 13 has been developed on the basis of the two hardware models 12 and 16. A program created using the formal language is thus portable (from one system to the other). For example, a hardware component of the first hearing system 10 has three setting levels for a wind noise suppression algorithm, whereas a corresponding hardware component of the second hearing system 11 has five setting options. These type-dependent setting options must then be taken into consideration in the formal language. In the housing of one and the same program 14 for both hearing systems 10, 11, different machine code is then generated for the second hearing system 11 than for the first hearing system 10 since the second hearing system has different setting options. In other words, the program 14 or the formal language on which it is based are abstracted to a certain extent from the hardware. The programmer does not need to be familiar with the respective hardware with regard to the adjustment.

The following listing shows an example of how the model (hardware model) in the form of a file, specifically in the preferred form of a file in .xml format, can be executed:

```
1  <!--Example of a model -->
2  <model>
3      <parameters> <!-- Node <parameters> contains all
         hearing aid parameters -->
4          <parameter name="VadEn"
             hardwareAddress="0x00ab04f4"/>
5          <parameter name="VadStrength"
             hardwareAddress="0x00ab05g0"/>
6          <parameter name="FbdSensitvity"
             hardwareAddress="0x00ab05g4"/>
7          <parameter name="Gain" withinChannel="GainChannel01"
             hardwareAddress="0x00abd000"/>
8          <parameter name="Gain" withinChannel="GainChannel02"
             hardwareAddress="0x00abd004"/>
9          <parameter name="Gain" withinChannel="GainChannel03"
             hardwareAddress="0x00abd008"/>
10         <parameter name="Gain" withinChannel="GainChannel04"
             hardwareAddress="0x00abd010"/>
11     </parameters>
12     <channels> <!-- If hearing aid parameters are arranged
        in channels, <channels> contains the definition -->
13         <channels-group name="GainChannels">
14             <chan name="GainChannel01" minFreq="100"
                 maxFreq="1000"/>
```

-continued

```
15        <chan name="GainChannel02" minFreq="1000"
              maxFreq="2000"/>
16        <chan name="GainChannel03" minFreq="2000"
              maxFreq="4000"/>
17        <chan name="GainChannel04" minFreq="4000"
              maxFreq="8000"/>
18      </channels-group>
19   </channels>
20   <values> <!-- Node <values> contains parameter values for all
         hearing aid parameters-->
21      <parValues name="Gain" translation="formula">
         <!--name="Gain":Values for any hearing aid parameter having
         the designation "Gain"-->
22         <domain> <!--translation="formula": Formula
             defines the translation between user input and hardware -->
23           <physicalUnit id="dB"/>
24           <magnitude type="decimalNumber"
               intDigits="2" fracDigits="0"/-->
25           <minValue>0</minValue> <!-User input
             is a decimal number having 2 integer digits, no digits
             after the decimal point and in the range between 0 and
             80 followed by the unit "dB" (decibel) -->
26           <maxValue>80</maxValue>
27           <granularity>1</granularity>
28         </domain>
29         <formula>
30           <domainToHardware>x/2</domainToHardware>
             <!--<domainToHardware> means: take the
             value x (the decimal number of the
             user input) and divide by 2 to obtain
             the hardware value -->
31           <hardwareToDomain>x*0.5</hardwareToDomain>
32         </formula>
33      </parValues>
34      <parValues name="AgcTime" translation="formula">
35         <domain>
36           <physicalUnit id="ms"/>
37           <magnitude id="decimalNumber"
               intDigits="3" fracDigits="0"/>
38           <domainToHardware>10</domainToHardware>
39           <maxDomainValue>150</maxDomainValue>
40           <granularity>10</granularity>
41         </domain>
42         <formula>
43           <domainToHardware>(x/10) -
               10</domainToHardware>
44           <hardwareToDomain>(x + 10) *
               10</hardwareToDomain>
45         </formula>
46      </parValues>
47      <parValues name="AgcCr" translation="tableLookup">
         <!--translation="tableLookup":a table defines the translation
         between user input and hardware -->
48         <table>
49           <value domainLabel="1.0"
               hardwareBitPattern="0000000000000000"/>
50           <value domainLabel="1.1"
               hardwareBitPattern="0000000111111100"/>
51           <value domainLabel="1.2"
               hardwareBitPattern="0000000111010100"/>
52           <value domainLabel="1.3"
               hardwareBitPattern="0000000111000100"/>
53           <value domainLabel="1.4"
               hardwareBitPattern="0000000110111000"/>
54           <value domainLabel="1.5"
               hardwareBitPattern="0000000110101100"/>
55           <value domainLabel="1.6"
               hardwareBitPattern="0000000110100000"/>
56           <value domainLabel="1.7"
               hardwareBitPattern="0000000100011000"/>
57           <value domainLabel="1.8"
               hardwareBitPattern="0000000110001110"/>
58           <value domainLabel="1.9"
               hardwareBitPattern="0000000110000100"/>
59           <value domainLabel="2.0"
               hardwareBitPattern="0000000101111100"/>
60         </table>
61      </parValues>
62      <parValues name="FbdSensitvity" translation="tableLookup">
         <!--the editor can display the contents of all domainLabel for
         user choice -->
63         <table>
64           <value domainLabel="weak"
               hardwareBitPattern="0000"/>
65           <value domainLabel="medium"
               hardwareBitPattern="0001"/>
66           <value domainLabel="strong"
               hardwareBitPattern="0010"/>
             <!--transferring the value 0010 to the hearing aid
             parameter FbdSensitvity sets it to the effect "strong" -->
67           <value domainLabel="extraStrong"
               hardwareBitPattern="0011
68         </table>
69      </parValues>
70   </values>
71 </model>
```

For all parameters having the name "Gain" (there are four of these in the model, one Gain parameter for each channel) the possible parameter values are defined under
a)<ParValues name="Gain"
where a formula, in other words a transformation rule, is employed,
which is denoted in the same line by
translation="formula".

The model defines that the domain-specific representation is dealt with here by means of a two-digit numerical value (magnitude type="decimalNumber" intDigits="2") and the physical unit "dB" (<physicalUnit id="dB">) in the range of validity from 0 (<minValue>0</minValue>) to 80 (<maxValue>0</maxValue>).

The model furthermore defines that the transformation of the logical (i.e. domain-specific) value into the physical (technical, hardware-specific) value is carried out by dividing the value by two.
(<domainToHardware>x/2</domainToHardware>).

The values for the response sensitivity of the feedback detection facility ("feedback detection sensitivity") are translated with the aid of a table (translation="tableLookup") from the logical, domain-specific representation into the corresponding physical value. Thus, for example, the setting to "strong" corresponds to the physical bit pattern value "0010" (<value domainLabel="strong" hardwareBitPattern="0010">).

Figure 3:
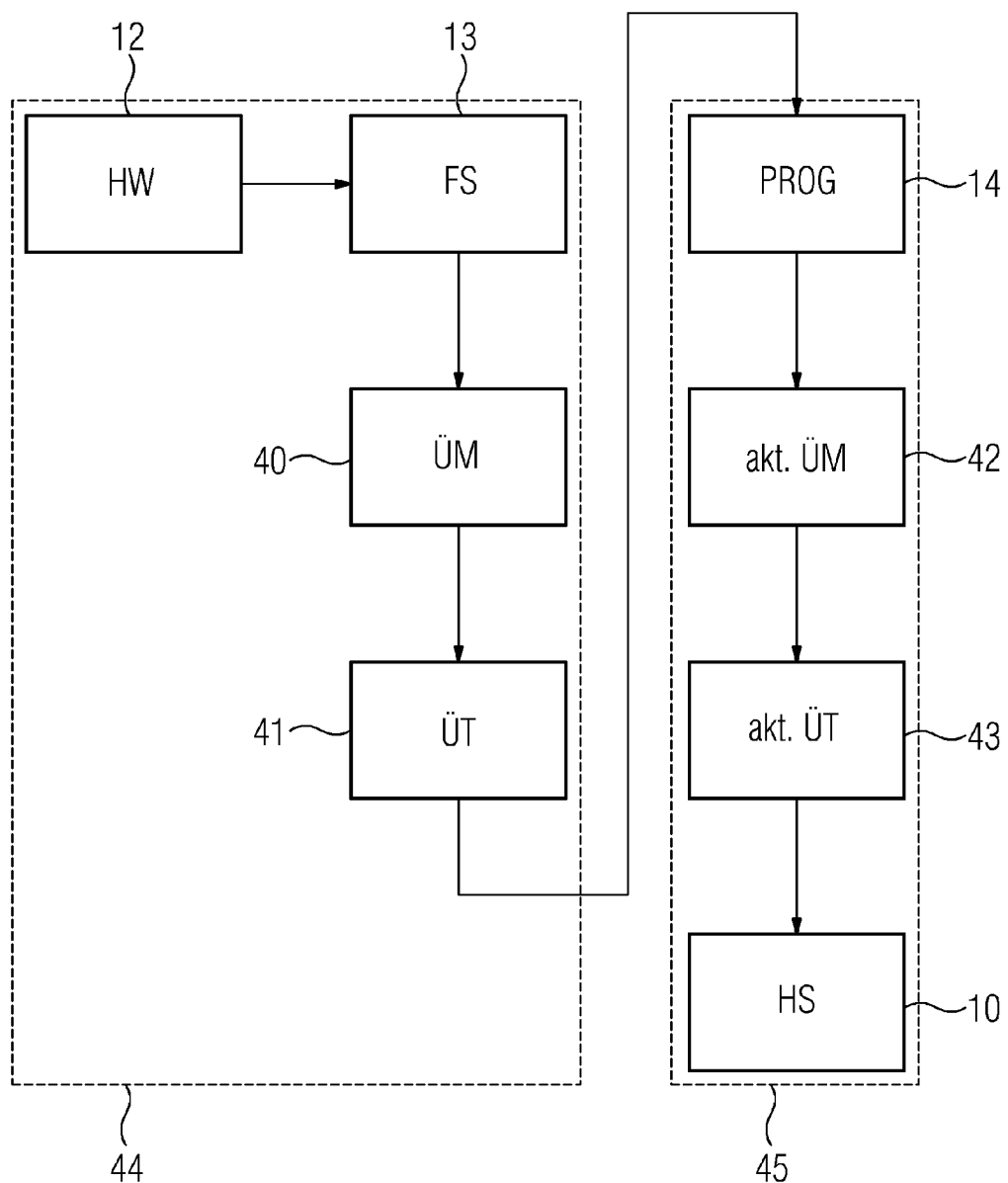
FIG. 3 is a schematic block diagram showing an overview of platform-specific and product-specific method steps.

A summary of platform-specific method steps and product-specific method steps is illustrated in FIG. 3. Platform-specific method steps 44 are to be executed on a one-off basis per platform and are to be undertaken by the manufacturer of the hearing system. These include the creation of a hardware model 12, a formal language 13, but also of an automatic translation mechanism 40 (ÜM) and an automatic transfer mechanism 41 (ÜT). The automatic translation mechanism 40 translates programs which are written in the formal language 13 into machine readable code. The automatic transfer mechanism 41 then transfers the machine executable programs into the hearing system 10. An appropriate infrastructure is thus created by the software development process.

This infrastructure is used by application experts who are thus able to execute the product-specific method steps 45 at least on a one-off basis, optionally repeatedly. The application experts can originate from the hearing system manufacturer or for example from OEM partners. These product-specific method steps 45 comprise the program 14 which is written by an application expert in the formal language. The application expert must activate the automatic translation mechanism for the program 14 (step 42) in order to produce the machine executable code. Finally, the application expert must activate the automatic transfer mechanism (step 43) in order to transfer the machine executable code onto the hearing system 10 (HS).

FIG. 4 shows the entire process for adjusting a hearing aid, the programming being carried out on the basis of a formal language. A hearing aid manufacturer develops hearing aids 20, adjustment software 21 which is used by a person skilled in the art 22 and an acoustician 23, and an integrated development environment 24 (IDE) which is likewise used by the person skilled in the art 22.

By preference, the software developers 25 create a development environment 24 which can be produced in automated fashion and software 21 which can be produced in automated fashion. In this situation, a definition of predefined identifiers 26 serves as the basis for the production process for the adjustment software 21. Furthermore, a definition of the predefined identifiers 26 and a definition of the concrete syntax 27 serve as the basis for creating the development environment 24.

The person skilled in the art 22 (person skilled in the art at a hearing aid manufacturer or an OEM partner or an independent acoustician) uses the development environment 24 in order to write a program 28. The program 28 is written in a human readable language (domain-specific language=DSL) and defines the behavior of a hearing system.

With the aid of the development environment 24, machine executable program code can be automatically generated (see arrows 29) for the person skilled in the art 22. The code 30 is capable of being executed by the adjustment software 21, by a smart phone, PDA, a remote control or another accessory 31 or by the hearing aid 20 itself. For the situation where the code was created for the adjustment software 21 or the accessory 31, the code changes the parameters of the hearing aid which the adjustment software or the accessory transfers to the hearing aid 20.

In an advantageous manner the definition of the audiological features is therefore created in a formal language (DSL) by the person skilled in the art. This means that it is possible during the actual creation process to perform a check as to whether the requirements are formally correct. The person skilled in the art can for example when using a corresponding tooling/editor be notified of errors during the input process by means of colored markings. Errors which may arise during the requirements engineering phase are thereby avoided.

The specialist term "Integrated Development Environment" (IDE) is used for such tooling in the following. This is a commonly used expression for development environments which are employed for so-called "general purpose languages", in other words programming languages such as C, C++, C#, JAVA or similar.

The definition and implementation of audiological features can be undertaken solely by a person skilled in the art. The person skilled in the art requires no development team. A number of communication paths from person to person, for example when using documents written in prose, on which errors typically occur are thereby dispensed with.

The implementation of audiological features does not require the use of an extended complete software engineering process but can be undertaken in automated fashion within one to a few minutes. This results in the now described advantages.

When this method is employed by a hearing aid manufacturer (manufacturer or OEM purchaser) time is saved in the development of hearing aid systems.

The product development (of hearing aids or hearing systems) can avail itself of a "rapid prototyping" technology whereby features are repeatedly designed, tested and modified on a trial basis.

As long as the formal language provides a division of features into individual, identifiable units (preferably: functions)–this creates the option for the person skilled in the art to re-use such units (code re-use). A consistent and structured re-use of code saves effort overall, reduces error susceptibility and maintenance work, and creates better conditions for later extensions.

In a preferred embodiment of the invention, the adjustment software which is employed by the audiologist uses machine executable programs created according to the invention which have been created on the target system of the adjustment software. Such a procedure has two organizational advantages for the manufacturer.

First, the development of adjustment software is distributed to a team of software developers and a team of staff members in an audiology department.

Second, there is a clear separation into platform and product development. The adjustment software is able to universally control a hearing aid platform.

Since the invention provides that the application expert creates his program parts for a specific, predefined set of application situations, the interface (the interaction scenarios) between the adjustment software and the parts created by the application expert is defined on a one-off basis such that product-specific (individual hearing aids or hearing aid families) programs can also be created and delivered by a plurality of application experts after completion of the adjustment software.

As a result of the high level of automation, the definition and development of features by persons skilled in the art who do not work for a hearing aid manufacturer additionally becomes possible. These may be audiologists (working independently, with their own business) or even experienced persons having a reduced hearing capability.

In particular, it should also be possible to involve in the system according to the invention as application experts audiologists who have learned or studied the field of the hearing aid acoustics and are thus able to deal with the identifiers defined in the formal language. As described, a preferred embodiment of the invention provides that the hearing system activates programs produced according to the invention. This means that it is possible to set the behavior of the hearing system very individually to the preferences of the person having a reduced hearing capability, which in turn makes use of the system appear more interesting to established acousticians.

The programs written by the application expert can be divided up as logical, identifiable units. Such units can then in each housing readily be stored in a user interface unit, the actual user interface of which symbolically or pictorially represents the effect of the program. In this manner, a visual "building block system" which the external application expert uses can be created for example by the manufacturer of hearing systems (or OEM partner). With this approach, both established acousticians and also experienced persons having a reduced hearing capability come into consideration as external application experts.

The involvement of established acousticians as external application experts also renders possible a further application: Groups of acousticians can exchange views over the internet on which solutions they have successfully employed for particular application situations. If for example a shrill clattering of crockery emerges as a typical housing for which the assistance of acousticians is requested, then acousticians can exchange views on whether they use a reduction in the gain at high frequencies or an increase in the compression. The prerequisites are in place for such a scenario since social networks are possible on the internet today and programs written according to the invention can be read by application experts.

The method according to the invention or a corresponding software system can be refined hierarchically as follows (A to H):

Software system/method which enables an application expert in audiology to write programs for the interrogation and modification of a hearing system in a formal language, a DSL (domain specific language), specialized in the specialist area of hearing systems and hearing system adjustment, and to translate the programs into a program which can be executed by the hearing system.

Software system as in A), in which the translation process is carried out in two successive steps. In a first step the program written by the application expert is translated into an abstract syntax tree.

Each such syntax tree conforms to the abstract syntax, i.e. a set of rules that describe which structures are permitted for syntax trees. In the second step, the abstract syntax tree is translated into a machine executable program for the target system.

Software system as in B), in which for the second step different translations are available in different target systems (for example remote control, PDA, Smartphone).

Software system as in A), in which the set of rules, in other words the abstract syntax, is described in four levels:
a. Description of the alphabet: Specification of the quantity of symbols which can be used in the language (alphabetic characters, digits, special characters).
b. Description of the words. Permissible combinations of the symbols forming words are specified. Regarding the words, a distinction is made between keywords and identifiers.
Keywords are defined symbol combinations which have a special meaning within the language.
ii. Identifiers are names which
1. can be allocated by the application expert for certain elements (free identifiers)
2. are defined together with the DSL and correspond to certain concepts from the field of application of the application expert (predetermined identifiers, for example gain control, compression control, frequency).
c. Description of the sets: Permissible combinations of keywords, identifiers and symbols are specified to form sets. The structure of the sets is preferably described with the aid of the context-free Backus-Naur Form (BNF).
Restriction of the sets through context conditions: Sets which result in a semantically (as regards content) incorrect program are excluded by means of rules (which are also referred to as "static semantics").

Software system as in D),
in which the formal syntax definitions as described under (D.a); (D.b.i); (D.b.ii.1); (D.c) and (D.d) are held in files, and in which the identifiers (D.b.ii.2) predetermined in the formal syntax definition are held in files.

Software system as in D), in which the translation process into machine readable code uses a formal model which maps the predetermined identifiers mentioned under (D.b.ii.2) to hardware parameters.

Software system as in D), which supports the audiologically experienced user by making available to him a development environment (IDE: Integrated Development Environment) specialized in the DSL/formal language. This is preferably characterized by one or more of the following characteristics:
a. Checking the inputs of the application expert for formal correctness in accordance with the syntax rules mentioned under (D). Marking of detected errors in the user interface of the development environment.
b. Checking the inputs of the application expert as to whether entered keywords are permissible, i.e. are allowed to occur in the DSL.
c. Colored highlighting of entered keywords.
(Note: Such a feature is also known as "syntax coloring").
d. Checking the inputs of the application expert as to whether entered identifiers can be used as free identifiers or otherwise correspond to a predetermined identifier and are thus allowed to occur in the program.
e. Selection lists of predetermined identifiers: On pressing a key ("hotkey"), the application expert receives a selection list of all predetermined identifiers which are permitted at the current location (cursor position in the development environment). He can select one of these identifiers by key or mouse input and thereby saves himself the character by character entry of the predetermined identifier.
If the application expert has already entered several alphabetic characters of a predetermined identifier, on pressing a key ("hotkey") he receives a selection list of all predetermined identifiers which are permitted at the current location and is moreover restricted to those predetermined identifiers which begin with the entered alphabetic character sequence. (Note: Such a feature is also known as "code completion".)
f. Activation option for automatic translations: in the user interface of the IDE the application expert can activate the automatic translation operations mentioned under A), B) or C). As a result, he receives the programs which can be executed on the target system. Since the application expert will as standard also be equipped with the target system, he can immediately test the executable programs on the target system(s).

Software system, wherein the development environment (IDE) mentioned under G) is created by means of a software toolkit which accepts as input
a. files which contain predetermined identifiers of the DSL (listed under E))
b. files which contain permissible set definitions of the formal language (listed under F)),
and from this input in automated fashion creates the development environment (IDE) for the person skilled in the art.

The invention claimed is:
1. A method for adjusting a hearing apparatus, which comprises the steps of:
creating a formal model describing individual parameters of hardware components of the hearing apparatus;
creating a formal language on a basis of the formal model;
creating a program with an aid of the formal language;
translating the program into machine executable code in two successive steps of:
creating a plurality of automatic translation mechanisms for translating programs written in the formal language into the machine executable code on its own target platform, and
activating the automatic translation mechanism for at least one of the programs on single or multiple occasions;
creating a corresponding plurality of automated transfer mechanisms which transfer the machine executable programs onto a respective target platform; and transferring the machine executable code to the hearing apparatus, an execution of the machine executable code causing the hearing apparatus to be adjusted automatically in accordance with the program.

2. The method according to claim 1, wherein the step of transferring the machine executable code to the hearing apparatus is carried out in two successive steps of:
   creating an automated transfer operation for transferring the machine executable code to the hearing apparatus; and
   activating the automated transfer operation on single or multiple occasions.

3. The method according to claim 1, wherein the hearing apparatus contains at least one of a filter bank or one amplifier, and parameters of which are set by means of the program.

4. The method according to claim 1, which further comprises measuring a hearing loss by a user of the hearing apparatus and the program acts or branches depending on a measured hearing loss.

5. The method according to claim 1, wherein when the program is being created a hearing program is produced for a predetermined hearing situation.

6. The method according to claim 5, which further comprises using the program to adjust to a predetermined ambient situation.

7. The method according to claim 6, wherein the predetermined ambient situation is defined by at least one parameter.

8. The method according to claim 6, which further comprises creating the program such that a machine executable program is activated automatically when the predetermined ambient situation exists or in a predetermined state transition of the hearing apparatus.

9. The method according to claim 1, wherein the step of translating the program consists of the following steps:
   translating the program into a software program which can be executed by a hearing aid adjustment program; and
   subsequently transforming the software program by the hearing aid adjustment program into the machine executable code.

10. The method according to claim 1, wherein the program is created using an editor, the editor performing one of:
    marking a programming error during an input process;
    identifying keywords in the formal language by means of a special color;
    making available to a user in a selection list on pressing a key all identifiers permissible for a current location/cursor position; or
    offering the user an option to activate an automated translation operation and transfer operation, with which an entered program is first translated into the machine executable code and then transferred into the hearing system.

11. The method according to claim 1, wherein a translation of the program takes place in a first step through transformation of the program into a syntax tree and in a second step through translation of the syntax tree into a program which can be executed for the hearing apparatus.

* * * * *